INVENTOR
JOHN M. OSEPCHUK
BY Robert T. Dunn
AGENT

Sept. 13, 1966  J. M. OSEPCHUK  3,273,006
TRAVELING WAVE TUBE HAVING A CONTOURED
ANODE COLLECTING SURFACE
Filed Feb. 1, 1962  5 Sheets-Sheet 4

INVENTOR
JOHN M. OSEPCHUK
BY Robert T. Dunn
AGENT

Sept. 13, 1966 J. M. OSEPCHUK 3,273,006
TRAVELING WAVE TUBE HAVING A CONTOURED
ANODE COLLECTING SURFACE
Filed Feb. 1, 1962 5 Sheets-Sheet 5

INVENTOR
JOHN M. OSEPCHUK
BY Robert T Dunn
AGENT

United States Patent Office 3,273,006
Patented Sept. 13, 1966

3,273,006
TRAVELING WAVE TUBE HAVING A CONTOURED ANODE COLLECTING SURFACE
John M. Osepchuk, Lexington, Mass., assignor to Raytheon Company, Lexington, Mass., a corporation of Delaware
Filed Feb. 1, 1962, Ser. No. 170,470
5 Claims. (Cl. 315—3.5)

This invention relates to traveling wave tubes including an elongated interaction space with electron collecting structure at one end of the space and more particularly to a crossed-field tube with an improved electron collecting structure.

Crossed-field traveling wave tubes generally include a slow wave propagating structure or wave delay line and an electrode coextensive therewith defining an interaction space. A cathode at one end of the space injects electrons into it, and the electrons are compelled to travel through the space by crossed electric and magnetic fields. The electric field is usually bound by the slow wave structure and the coextensive sole electrode, and the magnetic field is produced by an external magnet. The electrons travel through the space and exchange energy with waves propagating in the slow wave structure and emerge at the other end of the space each with a total energy equal to the sum of its potential and kinetic energies. Heretofore, substantially all these electrons have been collected by a single collector electrode at a potential, usually between the potentials of the coextensive electrode and propagating structure. The distribution of total electron energies at the point of collection usually spreads over a considerable range and, as a result, a large portion of the total number of electrons are collected by an electrode at a potential equivalent to considerably less than energy of the collected electrons. Electrons having a total energy greater than the potential of the collecting electrode will invariably generate heat in the collecting electrode upon striking it because the total energy of such electrons upon reaching the collector electrode will consist, in a large part, of kinetic energy. This heat will represent wasted energy decreasing the over-all performance of the tube. It is an object of the present invention to provide an electron collecting structure in a crossed-field traveling wave tube wherein a greater portion of the electrons are collected at a potential more closely equivalent to the total energy of the electrons to thereby improve tube performance.

In accordance with an important feature of the invention, a plurality of electron collecting electrodes are provided at the end of the interaction space, each energized at a different potential and each bounding an electric field in conjunction with an opposing conductive surface or electrode energized at another potential such that the course of electrons leaving the interaction space is altered and each electron is collected by the collecting electrode at the potential most closely equivalent to the total energy of the electron.

In preferred embodiments of the invention, the slow wave structure is energized at a potential greater than the coextensive sole electrode, and the plurality of collecting electrodes are energized at potentials therebetween. In some embodiments the collecting electrodes are contoured producing nonuniform electric fields immediately adjacent such electrodes of strength substantially less than the electric field strength in the interaction space so as to direct electrons leaving the interaction space more directly to one or the other of the collecting electrodes depending on the total energy of each electron.

Other features and objects of the invention will be more apparent from the following specific description taken in conjunction with the figures in which.

Figure 5:
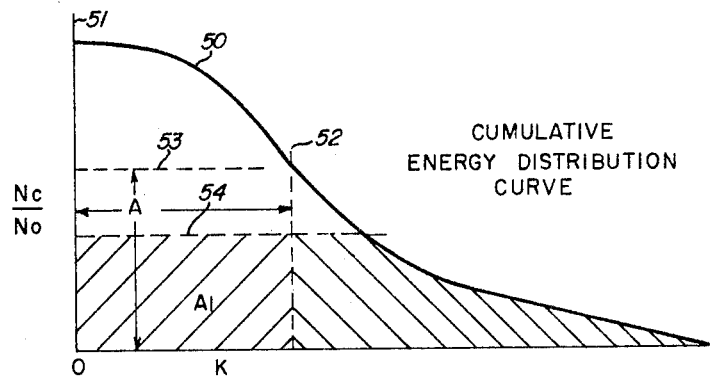
Figure 6:
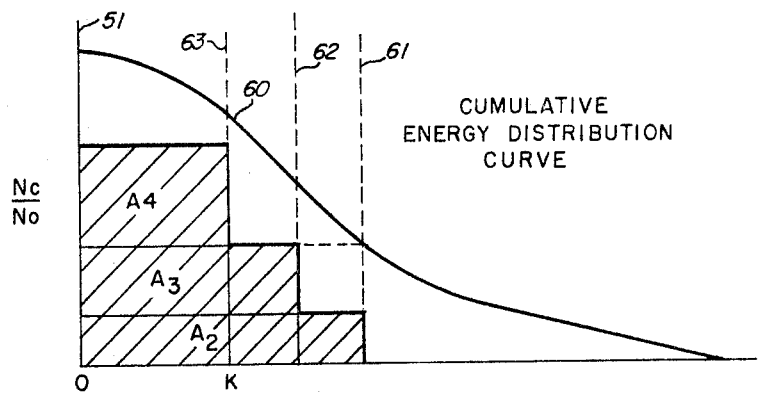
Figure 13:
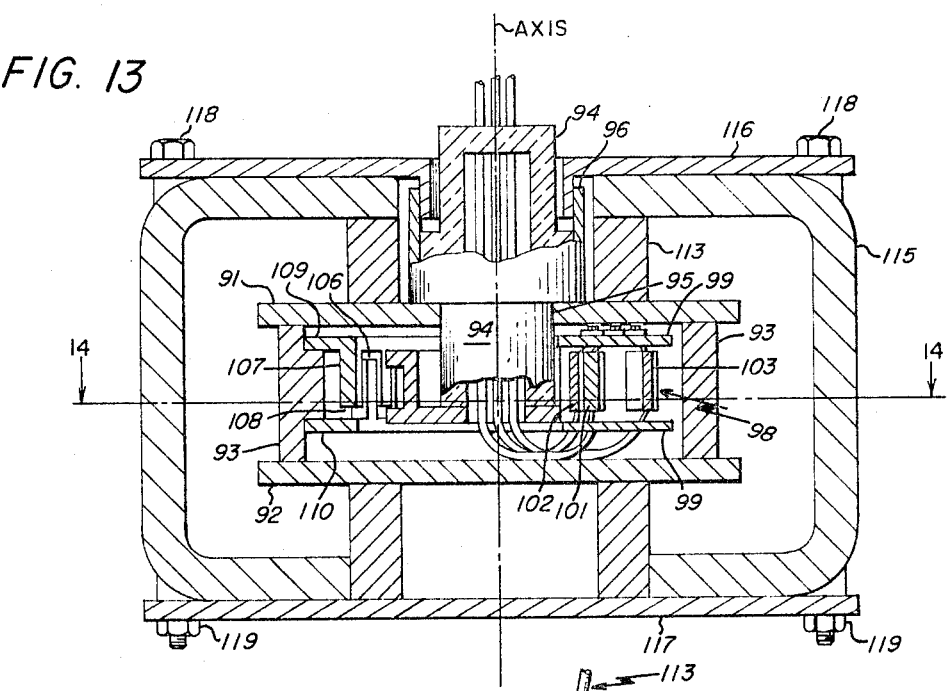
Figure 14:
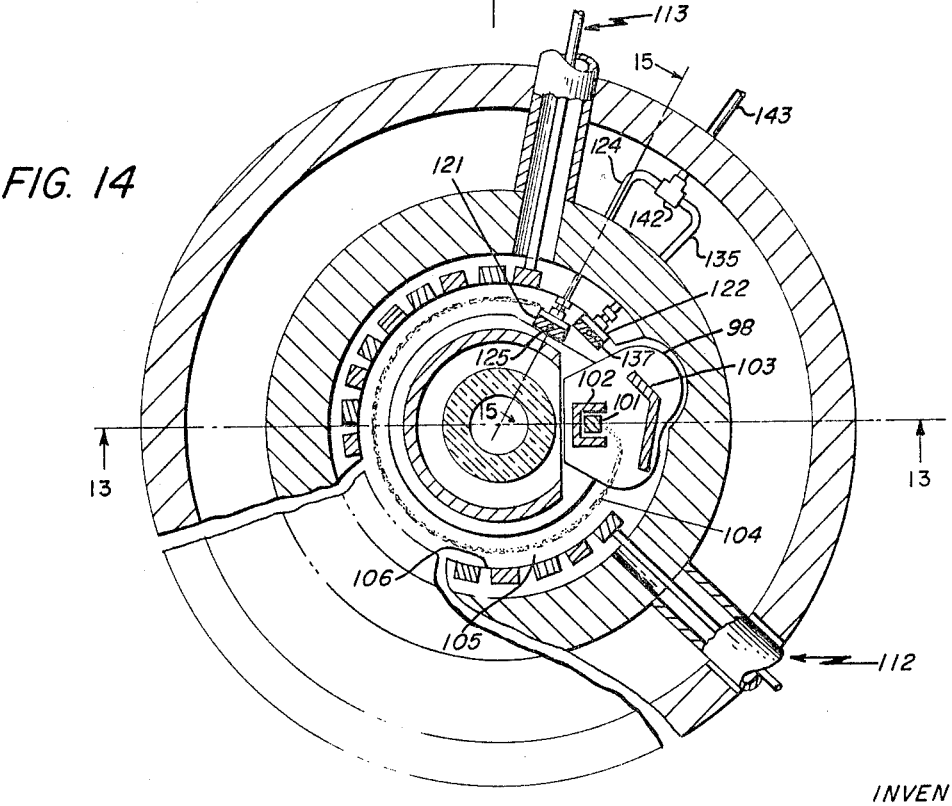
Figure 15:
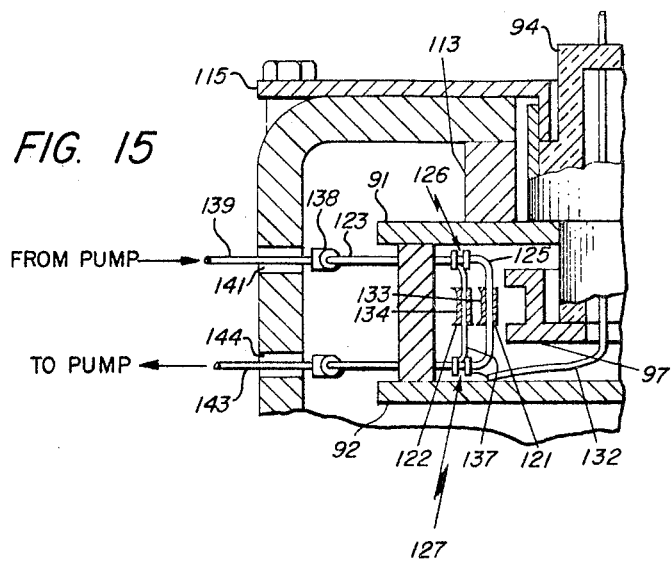
Figure 16:
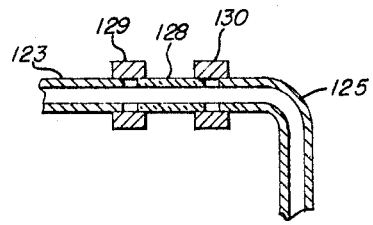

FIGS. 5 and 6 each illustrate a cumulative energy distribution curve of electrons emerging from the interaction space to show, by comparison, advantages of the invention;

FIGS. 7–12 are intended to represent a number of multiple electron collecting structures incorporating features of the invention and suitable for use in a crossed-field traveling wave tube;

FIG. 13 illustrates a side-sectional view of a crossed-field traveling wave tube having a circular interaction space and incorporating features of the invention;

FIG. 14 illustrates a plan-sectional view of the tube in FIG. 13 showing details of the multiple electron collecting structure included therein:

FIG. 15 illustrates a sectional view taken as shown in FIG. 14 to illustrate further details of the multiple electron collecting structure; and FIG. 16 illustrates details of parts shown in FIGS. 14 and 15.

Figure 1:
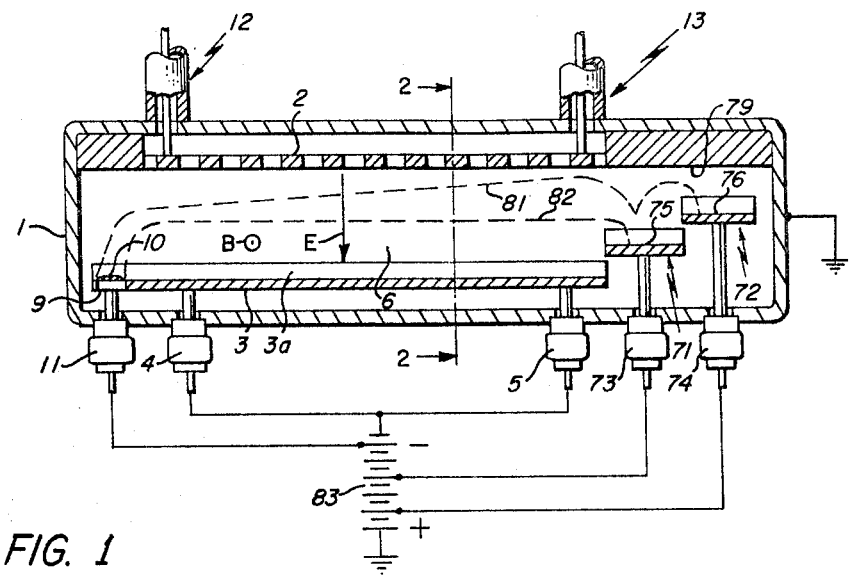
FIG. 1 illustrates a side-sectional view of a crossed-field traveling wave tube having a straight interaction space and including electron collecting electrodes disposed and energized in accordance with the invention.
Figure 2:
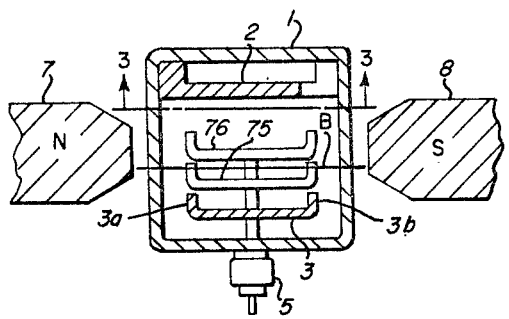
FIG. 2 illustrates a transverse side-sectional view of the tube in FIG. 1.
Figure 3:
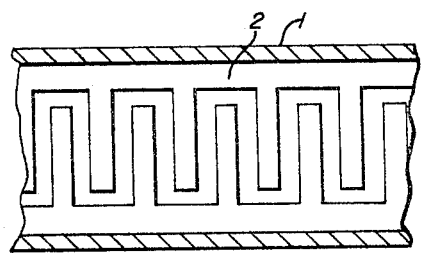
FIG. 3 illustrates a typical interdigital type slow wave structure suitable for use in the tube of FIGS. 1 and 2.

Turning first to FIGS. 1, 2 and 3 there are illustrated sectional views of a crossed-field traveling wave tube incorporating a simple embodiment of the invention. The side-sectional view of the tube shown in FIG. 1 reveals an electrically conductive envelope 1 enclosing a slow wave propagating structure 2 which may be an interdigital type, as shown or any other type. The structure is disposed along one wall of the envelope, and a coextensive sole electrode 3 with end shields 3a and 3b is disposed along the opposite wall of the envelope. The slow wave structure and the envelope are preferably maintained at ground potential, and the sole electrode 3 is preferably maintained at a potential considerably below ground. Accordingly, the slow wave structure may be attached directly to the envelope, and the sole electrode supported within the envelope by terminals such as 4 and 5 through which a D.C. potential is applied to the sole. Thus, an tween field E is produced in the interaction space 6 between the sole electrode and delay line, and this electric field may be of substantially uniform strength throughout the length of the interaction space which extends from one end of the slow wave structure to its other end. Magnet pole pieces 7 and 8 shown in FIG. 2, produce the transverse magnetic field B in the interaction space 6, and this magnetic field may also be of substantially uniform strength throughout the length of the interaction space.

An opening 9 is provided at one end of the sole electrode, and the cathode 10 is mounted in this opening. The cathode is supported by insulated terminal 11 which includes a conductor for applying a potential to the cathode. In operation electrons issuing from the cathode are compelled to move over arcuate paths by the transverse electric and magnetic fields (E and B) so that the electrons enter the interaction space and travel through this space from one end to the other exchanging energy with waves which propagate in the slow wave structure 2. The wave output terminal may be connected to one end or the other of the slow wave structure 2 depending on whether forward mode or backward mode interaction is the principal mode of interaction between the fields of the waves and the electrons in the interaction space. FIG. 1 illustrates, for example, a forward wave amplifier in which wave energy is coupled to the slow wave structure 2 at the end of the structure nearest the cathode, by, for example, a coaxial connector 12, and the amplified wave energy is coupled from the structure at its other end by coaxial connector 13.

In operation electrons leave the cathode and enter the interaction space all with substantially the same total energy. Thereafter, the electrons travel through the space giving up energy to the wave or taking energy from the wave propagating in slow wave structure 2 depending on the phase of the electrons with respect to the wave. For example, electrons which enter the interaction space in favorable phase with the field of waves propagating in the slow wave structure give up energy to the wave and thereby amplify it. On the other hand, electrons which are in unfavorable phase with the wave extract energy from the wave. In the course of travel through the interaction space the electrons which are in unfavorable phase and which extract energy from the wave are compelled to move into phase with the wave and, by this process, the electrons are bunched into periodic groups each in favorable phase with the wave. As a result, a greater and greater portion of the electrons flow in favorable phase with the wave as one progresses from one end to the other of the interaction space. Since this process of bunching occurs gradually down the length of the interaction space, it follows that all electrons do not flow in favorable phase with the wave along the same portion of their path through the length of the interaction space, and, accordingly, all electrons do not give up the same amount of energy to the wave. Furthermore, the total energy of each electron as it reaches the end of the interaction space is not made up of the same proportions of potential and kinetic energy, and so the transverse dimensions of the beam are considerably greater at this end than at the cathode end of the interaction space. In other words, the beam spreads in its course through the interaction space.

Figure 4:
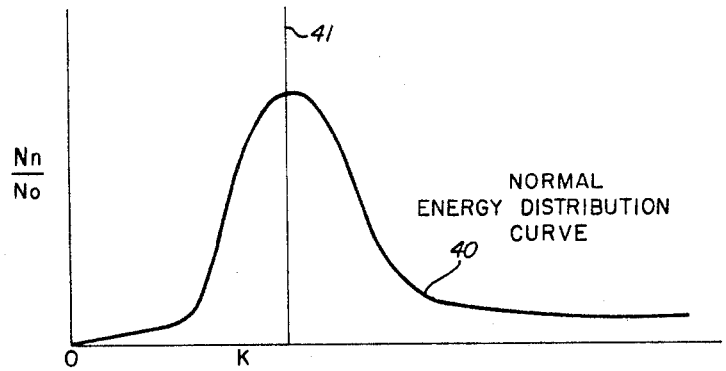
FIG. 4 is a curve illustrating the normal energy distribution of electrons emerging from the interaction space of a typical crossed-field tube such as shown in FIG. 1.

The energy distribution of the electrons at the end of the interaction space remote from the cathode may be typically represented by the curve 40 shown in FIG. 4. This curve represents a plot of nondimensional or normalized parameters. The parameters represent total electron energy versus number of electrons for the beam at the end of the interaction space sometimes called the normal energy distribution curve. The ordinate is the ratio of the number of electrons, $N_n$ having a total normalized energy represented as K to the total number of beam electrons $N_o$. The term K is an energy parameter defined as follows:

$$K = 1 - \frac{W}{V_p}$$

where $V_p$ is the potential difference between cathode and anode, and W is the energy in electron volts, given up by the electron to the RF field. It is evident that the number of electrons having a total normalized energy of about $K=1$ or greater is small, and the total number for which $K=0$ is practically zero. Heretofore, it has been found desirable to attempt to collect the electrons at the remote end of the interaction space with a collecting electrode at a potential (referenced to the anode) which is equivalent to the total energy of a majority of the electrons (referenced to the anode). In other words, the absolute magnitude of the difference between collecting electrode potential and anode potential in electron volts is preferably equal to the absolute magnitude of the sum of electron kinetic energy plus the electron potential energy, with reference to the anode, as the electron emerges from the interaction space. This condition is indicated herein by stating that total electron energy equals collecting electrode potential.

If all electrons were collected by electrodes at potentials equal to the total energy of each electron as the electron emerged from the interaction space then the change in total energy of each electron from the instant it leaves the cathode to the instant it is collected would substantially represent energy exchanged by the electron with the wave fields in the interaction space. In the past, it has been desirable to collect the electrons at a potential equivalent, for example, to the energy line 41 shown in FIG. 4. As can be seen, however, a great many of the electrons would not have sufficient energy to be collected by such an electrode, and a great many of those collected would have greater total energy than the energy represented by line 41, and this excess energy would be transferred to the collecting electrode in the form of heat, which is not desirable. The present invention contemplates structure for avoiding this by collecting a greater proportion of electrons at a potential level more closely equivalent to the total energy of each electron. Important features and advantages of the invention become apparent by reference to the cumulative energy distribution curve of the electron beam at the end of the interaction space just prior to collection.

FIGS. 5 and 6 illustrate identical cumulative energy distribution curves 50 and 60 each corresponding to the normal energy distribution curve 40 shown in FIG. 4. The ordinate in the cumulative curve represents the ratio of the number of electrons $N_c$ which give up not more than the energy W to the total number of electrons $N_o$ in the beam at the end of the interaction space. If each of the electrons were collected by an electrode at a potential precisely equivalent to the total energy of the electron at the instant it emerges from the interaction space, there would be no heat generated in the collecting electrodes and over-all tube efficiency $\eta$ would be high. Over-all tube efficiency $\eta$ may be considered as substantially equal to the net RF power output divided by the D.C. power input. In an ideal case, the flow of electrons from the power supply to the cathode through the interaction space to the collecting electrode and back to the power supply would cause no heating whatsoever along this path, and the total energy change of the electrons in traveling over this path would approach in value the energy transferred to the wave propagating in the slow wave structure. This ideal case assumes there is no electron flow to the slow wave structure itself or to the sole electrode and is never accomplished in practice. In contrast to this ideal condition, consider the special case where all electrons are collected at anode potential which is the potential of the slow wave structure. Over-all tube efficiency in this special case is by definition herein represented by $\eta_0$ and would be equal to the net RF output power divided by the product of cathode current flow times cathode to anode potential.

The efficiencies of $\eta$ and $\eta_0$ may be related by the following equation:

$$\eta = M\eta_0$$

in which the factor M is a figure of merit. The significance of the factor M can be seen by reference to the cumulative energy distribution curve in FIG. 5. If, for example, all electrons are collected at anode potential $V_p$, represented by line 51 (at $K=0$), then the ratio $N_c/N_o$ of electrons emerging from the interaction space having a total energy equivalent to or greater than the potential represented by line 51 would be unity and a large proportion of the electrons would have considerably greater total energy than $V_p$ and would impart heat when collected. In this case, M must equal unity so that $\eta$ would equal $\eta_0$. If, however, a collecting electrode is located at the end of the interaction space and maintained at a potential represented by line 52, then a considerable number of electrons having the same or only little more total energy than the potential represented by line 52 will be collected by such a collector and heating will be considerably reduced. In this case the factor M must be greater than unity, so that $\eta$ will be greater than $\eta_0$. If, in fact, all electrons having total energies at least as great as that represented by line 52 were collected by such a collecting electrode, it can be shown that the factor M is a function of the magnitude of the area A, enclosed by ordinate line 52 and abscissae line 53. It has been found convenient to represent M in terms of A as follows:

$$M = \frac{1}{1-A}$$

Since, in practice, all electrons which can be collected by the collecting electrode at a potential equivalent to line 52, are not collected by it but some manage to slip by the electrode and are collected on the envelope wall which is at anode potential, the ordinate line 52 will not define an area with an abscissa crossing at a point on curve 50, but will define an area $A_1$ with an abscissa 54 crossing at a point which falls short of curve 50. The area $A_1$ is somewhat smaller than the area A but will yield a practical value of M.

The present invention contemplates structure whereby the factor M may be increased and is made clear from the following explanation with reference to the cumulative energy distribution curve. This curve is reproduced again in FIG. 6 and represented by line 60. If a plurality of collecting electrodes are included each at a different potential such as represented by lines 61, 62 and 63 in FIG. 6 and these electrodes are disposed at the end of the interaction space, the electrodes will intercept and collect electrons having cumulative energies, the portions of which do not cause heating of the collecting electrode being represented by the areas A2, A3 and A4 shown in FIG. 6. The three areas shown obviously cannot overlap because the same electron cannot be collected by two diffeernt collecting electrodes. Furthermore, it is the summation of the three areas that is important rather than the portion each contributes to the sum. As already stated above, these areas are defined by ordinates and abscissae lines which do not meet at the curve 50 but meet at points which are short of the curve. The reason for this is that each of the electrodes does not collect all of the electrons, not already collected, which have sufficient energy to reach it; a portion of the electron beam slips past the electrodes and is collected at anode potential.

It is quite apparent that the total of areas A2, A3 and A4 is greater than the area $A_1$ in FIG. 5, and, consequently, it is apparent that the factor M will be greater where a plurality of collecting electrodes are employed than where a single collecting electrode is employed. In the case where three electrodes are employed, the factor M is expressed as follows:

$$M = \frac{1}{1 - A2 - A3 - A4}$$

Turning again to FIGS. 1–3 there are shown two collecting electrodes 71 and 72 supported by insulated terminals 73 and 74 with their collecting surfaces 75 and 76 substantially parallel to equipotential levels in the interaction space 6 and preferably aligned with equipotential levels representing potentials below the potentials applied to the electrodes 71 and 72. This location is preferred so that the collecting surfaces cooperate with the dummy anode surface 79 to bound electric fields which are substantially weaker than the electric field E in the interaction space 6. The weaker electric fields in the collecting spaces are preferred so that electrons upon leaving the interaction space and entering the collecting spaces immediately follow paths which are more cycloidal than followed in the interaction space, and thus move toward the collecting surfaces 75 and 76 of the electrodes. For example, lines 81 and 82 represent the paths through the interaction space followed by electrons which are subject to equal and opposite forces by the electric and magnetic fields E and B in the space. Line 81 represents the path of electrons having relatively low total energy throughout, and line 82 represents the path of electrons having relatively high total energy throughout. It is desirable (in accordance with the present invention) to collect electrons flowing along path 81 at a potential closer to anode potential than electrons flowing along path 82. Accordingly, a lower potential is applied to collecting electrode 71 than is applied to electrode 72. It is further preferred that the electric field between electrode 72 and dummy anode surface 79 be substantially weaker than the electric field between electrode 71 and the dummy anode surface. As a result, the electrons flowing along paths 81 and 82, upon entering these weaker fields, immediately follow cycloidal type paths which swing toward the collecting electrode surfaces 75 and 76. These paths are preferably cycloidal or epicycloidal and some, ideally, reach the collecting surfaces of the electrodes at a point along the paths where electron kinetic energy is zero. Most electrons, however, will at the instant they are collected have some kinetic energy, but it will be considerably less than the electron had as it emerged from the interaction space. This is because an electron following a cycloidal type path will have a different ratio of kinetic to potential energy along different parts of the path even though total electron energy remains constant. The collecting electrode surface is preferably disposed to catch as many electrons as possible where this ratio is as low as possible. As a result, the collected electrons cause little or no heating of the collecting electrode which results in improved tube performance for reasons already discussed above.

A source of potentials for the various electrodes enclosed within the envelope of the tube shown in FIGS. 1 and 2 is represented by battery 83 which is shown connected to terminals to indicate one suitable technique for energizing the electrodes. As shown the lowest potential is applied to the sole electrode 3 with increasing potentials being applied to the other electrodes in the following order: cathode 10, collecting electrode 71, collecting electrode 72, and finally the anode which includes the envelope 1, the slow wave structure 2 and the dummy anode surface 79, all at ground potential. This technique for energizing the electrodes is made to show one suitable method. However, it should be clear that principles of the invention could readily be applied in a tube in which the sole electrode was maintained positive with respect to the slow wave structure with the cathode maintained at a potential between the two. In such a tube it would be required that the position of the slow wave structure and sole be interchanged.

FIGS. 13, 14 and 15 illustrate an application of principles of the invention to a crossed-field traveling wave tube having a circular interaction space. Such a tube is shown in side and plan sectional views in FIGS. 13 and 14 and is generally a figure of revolution except for certain parts apparent in FIG. 14. A section revealing details of the collecting structure is shown in FIG. 15. The tube envelope is formed by upper and lower plates 91 and 92 which seal to anode ring 93 and by ceramic support 94 which seals to an opening 95 in plate 91 by sleeve 96. The ceramic support 94 supports the sole electrode 97 within the envelope, and the sole electrode, in turn, supports the gun structure 98. The gun structure consists of plates such as 99 attached to the sole with a plurality of electrodes mounted therebetween. These electrodes might, for example, include an electron emitting cathode and heater 101, a grid 102 and an accelerating electrode 103. The electron gun injects electrons in the form of a beam 104 into the interaction space 105 which is defined by the sole electrode and the interdigital slow wave structure 106. The slow wave structure could be the interdigital type as shown preferably consisting of two sets of fingers 107 and 108 projecting from similar anode rings 109 and 110 which are rigidly attached to the anode cylinder 93. The interdigital slow wave structure is not continuous and, accordingly, has two ends to which terminals such as coaxial terminals 111 and 112 are coupled. If interaction between waves propagating in the slow wave structure and the beam is in a forward mode and the tube is intended for use as an amplifier, then coaxial terminal 112 is an RF input terminal, and terminal 111 is an RF output terminal.

The electrons issuing from the electron gun are compelled to travel through the arcuate interaction space by crossed electric and magnetic fields. The electric field is established by the potential difference between the sole electrode and the slow wave structure and is directed radially with respect to the axis of the tube. The magnetic field in the interaction space is bounded by the cylindrically shaped magnetic pole pieces 113 and 114 which are disposed against the upper and lower plates 91 and 92, respectively, substantially coaxial with the axis of the tube. The pole pieces are preferably fastened to opposite poles of a magnet 115 and the complete assembly held together between outer plates 116 and 117 by bolts such as 118 fastened by nuts 119. The magnet 115 may be an electromagnet or a permanent magnet as shown and may be a figure of revolution as shown or may have any suitable shape for producing a magnetic field in the interaction space which is substantially uniform throughout and directed parallel to the axis of the tube.

In operation the electrons move through the interaction space exchanging energy with waves propagating in the slow wave structure as already described with reference to FIGS. 1–3. Electrons which give up energy to the beam will generally move to higher and higher equipotential levels established by the electric field bounded by the structure and the sole electrode, and, accordingly, will be inclined to move closer and closer to the slow wave structure which is at anode potential. In accordance with the present invention, electrons upon traversing through the interaction space are collected by a plurality of electron collecting electrodes at different potentials. Two such electron collecting electrodes 121 and 122 are disposed at one end of the interaction space, and each is supported by similar tube structures which conduct cooling fluid through the electrode. One of the tube support structures is illustrated in FIG. 15 which is a sectional view taken as shown in FIG. 14 to illustrate the electrical connections and support to the collecting electrode 121. The support structure might, for example, include tubes 123 and 124 attached to the ends of a tube 125 passing through the width of the collecting electrode 121. The tubes are attached by insulating adapter tubes 126 and 127 so that tube 125 is electrically insulated from tubes 123 and 124. The adapter tubes 126 and 127 might each include a short section of glass or ceramic tubing 128 with rings 129 and 131 made of a metal sold under the trade name Kovar fastened to each end as shown in FIG. 16. The rings 129 and 131 in turn fasten to tubes 123 and 125 to complete an insulated electrode support through which cooling fluid can be conducted to the electrode. Electrical leads such as 132 for providing potentials to electrodes 121 and 122 are preferably brought out through ceramic support 94 along the tube axis as shown. This construction is preferred so that all leads providing potential within the tube envelope will be carried by the ceramic support.

In some applications it is advantageous to include end shields at the edges of the collecting surfaces to insure that a greater portion of the electron beam will be collected by each electrode. Such end shields are shown as part of collecting electrodes 121 and 122. The collecting surfaces 133 and 134 of these electrodes are shown contoured in a direction parallel to the magnetic field in the electron collecting space extending between the pole pieces. The contour is preferably such that the ends of the collecting surfaces are closer to the anode cylinder 93 than the center of the surface.

Electrode 122 is supported in the same manner as electrode 121 by a pair of tubes 135 and 136 which attach to opposite ends of a tube 137 passing through the width of electrode 122. The attachments are made by adapters similar to that shown in FIG. 16. Tube 136 is not indicated in the drawings; it is directly behind tube 123 shown in FIG. 15.

One convenient method for introducing cooling fluid to the electrodes is illustrated in the figures. For example, tubes 136 and 123 might connect by fitting 138 to a larger tube 139 which passes through an opening 141 in the magnet. Likewise, tubes 124 and 135 connect by fitting 142 to a tube 143 which passes through opening 144 in the magnet. The tubes 139 and 143 connect to a suitable fluid pump system.

It should be quite clear that numerous other features of the present invention could be included to further improve performance of a tube such as shown in FIGS. 13–16. For example, the collecting surfaces could be contoured in a direction transverse to the electric and magnetic fields in the collecting space, or the surface of the anode facing the collecting surfaces could be contoured so that nonuniform electric fields would be bounded therebetween in the collecting spaces. The desirability of nonuniform electric fields in the collecting space in a direction transverse to the magnetic field is discussed below with reference to FIGS. 7–12 which illustrate additional features of the invention and are intended to show the general structure of collecting electrodes at the end of the interaction space defined by the slow wave structure and sole electrode. In each of these figures the slow wave structure is denoted 151, and the sole electrode is denoted 152. The figures are intended to illustrate a sectional view taken through the slow wave structure, sole electrode and collecting electrodes in a plane including a substantial part of the electron beam and directed perpendicular to the surface of the sole electrode and collecting electrodes. The relative potentials applied to each of the collecting electrodes and the slow wave structure and sole electrode are also indicated in each of the figures by electrical connections to a battery 153 and by broken lines representing equipotential levels.

Figure 7:
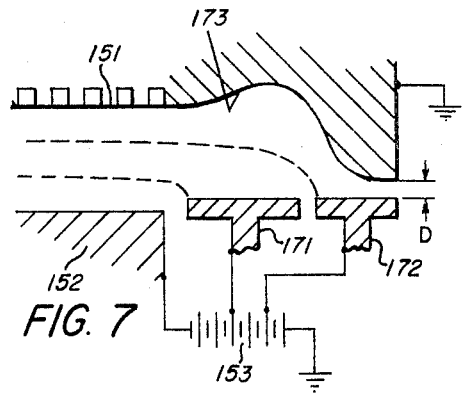
Figure 8:
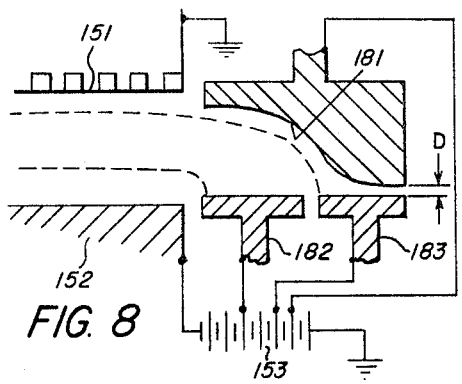

In FIG. 7 two collecting electrodes 171 and 172 are disposed with their collecting surfaces parallel and bounding different electric fields with the contoured collecting anode 173 which is merely an extension of the slow wave structure and at the same potential as the slow wave structure. The purpose of contouring the collecting anode 173 is to provide nonuniform electric fields adjacent each of the collecting surfaces, the nonuniformity being such as to insure more complete collection of electrons in accordance with features of the invention described above with reference to FIGS. 4–6. Accordingly, electrode 171 is at a lower potential than electrode 172, and both are at higher potentials than the sole electrode as shown by the electrical connections to the battery. The embodiment illustrated in FIG. 8 also includes a contoured anode surface for bounding electric fields with the collecting electrodes. However, the contoured anode surface 181 is not maintained at the potential of the slow wave structure; it is preferably maintained at a lower potential. As a result, the equipotential lines extending from the interaction space dip sharply toward the collecting electrodes 182 and 183. In addition, collecting electrode 182 is preferably maintained at a potential equal to cathode potential so that current flow thereto does not represent a power expenditure and is not a load on the power supply for the tube. Accordingly, electrode 182 may be connected within the tube envelope directly to the cathode. The advantages and structure for collecting electrons in a traveling wave tube at a potential equal to cathode potential are discussed in copending application Serial No. 133,472 by Dench et al., filed Aug. 23, 1961.

The shape of the contoured surface of the anode which bounds electric fields with the collecting electrodes is preferably such that the gap or space between the anode electrode and the collecting electrodes eventually decreases along the direction of electron flow. In fact, it is preferred that the separation decrease to the dimension D shown in FIGS. 7–12 and defined by the following equation:

$$D \leq \frac{1}{2B}\sqrt{\frac{2V}{\frac{e}{m}}}$$

in which V is the voltage across the dimension D, $e/m$ is the electron charge to mass ratio, and B is the strength of the transverse magnetic field. When D satisfies the above equation, electron flow through the space is theoretically cut off. Preferred locations of the spacing dimension D are shown in the figures but may be located elsewhere to accomplish the same effects.

Figure 9:
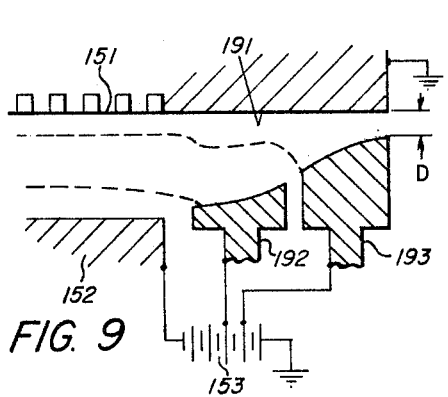
Figure 10:
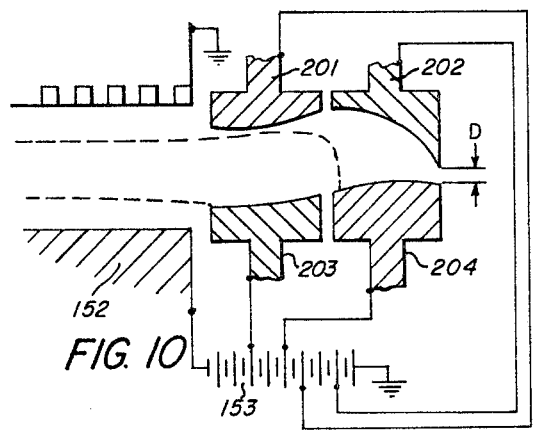

FIG. 9 illustrates a structure wherein the anode electrode 191 in the collecting space is at the same potential as the slow wave structure and is merely an extension thereof and in which the collecting electrodes 192 and 193 have collecting surfaces which are contoured, thereby achieving somewhat the same effect as achieved by the structure shown in FIG. 7. FIG. 10 illustrates structure wherein both the collecting anode and the collecting electrode surfaces are contoured and in which two collecting anode structures 201 and 202 are employed maintained at different potentials which are preferably both negative with respect to the potential of the slow wave structure. As shown in FIG. 10 the collecting electrodes 203 and 204 have collecting surfaces which are contoured in a manner somewhat similar to the surfaces in FIG. 9. However, in addition, each bounds an electric field with a different one of anode structures 201 and 202, both of which have contoured surfaces. It is generally preferred that the contouring be such that the spacing between the collecting surface and opposing anode dimensions to the value D defined by the above equation to insure that only a minimum portion of the electron beam flows past the collecting electrodes.

Figure 11:
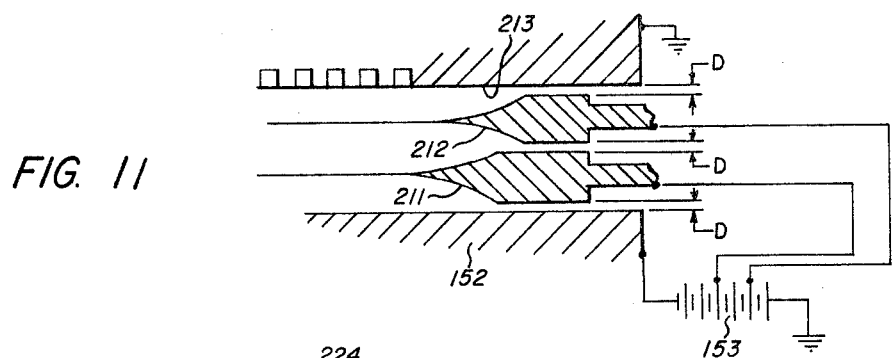

FIG. 11 illustrates an application of the invention employing a somewhat different type of collecting electrode structure. Each collecting electrode 211 and 212 in FIG. 11 is substantially wedge-shaped with the point of the wedge in line with a preselected equipotential line in the interaction space. The points of the wedges are staggered as shown, and potentials are applied to each wedge substantially equal to the equipotential line which terminates at the point of the wedge. The spacing between the wedges and the spacing between each wedge and the immediately adjacent dummy anode 213 or sole electrode 152 are preferably all less than the dimension D defined in the above equation and, accordingly, define spaces which are cut off to the electron beam.

Figure 12:
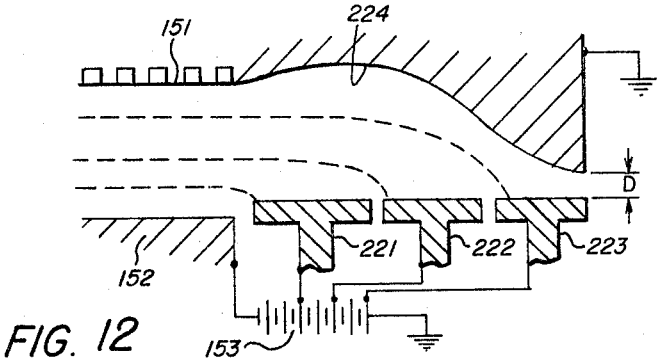

FIG. 12 illustrates a structure similar to the structure shown in FIG. 7 but including a third collecting electrode maintained at a third potential which is different from the potentials applied to the other two collecting electrodes. In FIG. 12 three collecting electrodes 221, 222 and 223 are employed and disposed with collecting surfaces substantially parallel and opposites a contoured collecting anode 224. The three collecting electrodes are maintained at potentials which increase in general direction of electron flow, and are all greater than the potential applied to the sole electrode. Additional electrodes (more than three) could be included, and the addition of each would improve tube performance for reasons already described above; however, the additional improvement gained by each added collecting electrode decreases rapidly as the number of electrodes increases. Accordingly, a point is reached where it becomes unfeasible to employ additional collecting electrodes (more than two or three) because the gain in performance is not appreciable.

While there are described herein a number of embodiments of the invention, it is to be clearly understood that these embodiments are made only by way of example and do not limit the spirit or scope of the invention which is set forth in the accompanying claims.

What is claimed is:
1. A traveling wave tube comprising:
   a slow wave propagating structure;
   a cathode injecting electrons into an interaction space adjacent said structure wherein said electrons exchange energy with waves propagating in said structure;
   means for producing a magnetic field transverse to said interaction space;
   means including a plurality of electrodes each having electron collecting surfaces and each energized at a different potential disposed at the end of said interaction space;
   and a contoured collecting anode disposed adjacent to said slow wave propagating structure and spaced from said electron collecting surfaces to produce therewith progressively varying electric field strengths to intercept and direct to the respective electron collecting surfaces electrons issuing from said interaction space at levels of total kinetic and potential energy closely equivalent to the respective varying electric field strengths adjacent said collecting surfaces.

2. The apparatus of claim 1 wherein said contoured collecting anode forms an extension of said slow wave propagating structure.

3. The apparatus of claim 1 in which the space between the contoured collecting anode and the collecting surfaces decreases along the direction of electron flow.

4. The apparatus of claim 1 in which the space decreases gradually to the dimension D in accordance with the formula:

$$D \leq \frac{1}{2B}\sqrt{\frac{2V}{\left(\frac{e}{m}\right)}}$$

in which V is the voltage across the dimension D, $e/m$ is the electron charge to mass ratio and B is the strength of the transverse magnetic field.

5. The apparatus of claim 1 in which both the contoured collecting anode and the collecting surfaces are contoured.

References Cited by the Examiner
UNITED STATES PATENTS

| | | | |
|---|---|---|---|
| 2,632,866 | 3/1953 | McArthur | 315—39.3 X |
| 2,875,362 | 2/1959 | Serang | 315—5.38 X |
| 3,084,278 | 4/1963 | White | 315—39.3 |
| 3,172,004 | 3/1965 | Von Gutfeld | 315—39.3 X |
| 3,188,515 | 6/1965 | Kompfner | 315—5.38 X |

HERMAN KARL SAALBACH, *Primary Examiner.*

GEORGE N. WESTBY, *Examiner.*

V. LAFRANCHI, S. CHATMON, JR.,
*Assistant Examiners.*